United States Patent
Lee

(10) Patent No.: US 11,110,908 B2
(45) Date of Patent: Sep. 7, 2021

(54) HYBRID VEHICLE AND METHOD OF CONTROLLING MODE TRANSITION THEREOF

(71) Applicants: HYUNDAI MOTOR COMPANY, Seoul (KR); KIA MOTORS CORPORATION, Seoul (KR)

(72) Inventor: Young Jun Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 319 days.

(21) Appl. No.: 15/835,228

(22) Filed: Dec. 7, 2017

(65) Prior Publication Data

US 2018/0297576 A1 Oct. 18, 2018

(30) Foreign Application Priority Data

Apr. 17, 2017 (KR) ........................ 10-2017-0049178

(51) Int. Cl.
*B60W 20/10* (2016.01)
*B60W 10/06* (2006.01)
(Continued)

(52) U.S. Cl.
CPC ............. *B60W 20/10* (2013.01); *B60K 6/442* (2013.01); *B60W 10/02* (2013.01); *B60W 10/06* (2013.01);
(Continued)

(58) Field of Classification Search
CPC ...... B60W 20/10; B60W 20/11; B60W 20/40; B60W 20/20; B60W 10/02; B60W 10/08;
(Continued)

(56) References Cited

U.S. PATENT DOCUMENTS 5,846,155 A * 12/1998 Taniguchi ................ B60K 6/48
477/2
5,950,787 A * 9/1999 Murasugi ................ F16D 25/06
192/85.25
(Continued)

FOREIGN PATENT DOCUMENTS

JP 2005-218221 A 8/2005
JP 2017177973 A * 10/2017 ............ B60W 20/40
(Continued)

OTHER PUBLICATIONS

Espace efficiency multiplication search (Year: 2019).*
(Continued)

*Primary Examiner* — Jeff A Burke
*Assistant Examiner* — Kyle T Johnson
(74) *Attorney, Agent, or Firm* — Morgan, Lewis & Bockius LLP

(57) ABSTRACT

A method of performing a mode transition in a hybrid vehicle includes: determining a transition from a first mode to a second mode; comparing a driver's required torque with a maximum torque of an electric motor, determining a compensation torque when the driver's required torque is greater than the maximum torque; and determining a first torque to be output from an engine and a second torque to be output from a hybrid starter generator, which is connected to the engine, in consideration of the compensation torque and a system efficiency.

20 Claims, 5 Drawing Sheets

(51) Int. Cl.
*B60W 10/08* (2006.01)
*B60W 10/02* (2006.01)
*B60K 6/442* (2007.10)
*B60W 20/20* (2016.01)
*B60W 20/40* (2016.01)
*B60K 6/48* (2007.10)
*B60W 20/11* (2016.01)

(52) U.S. Cl.
CPC .......... *B60W 10/08* (2013.01); *B60W 20/11* (2016.01); *B60W 20/20* (2013.01); *B60W 20/40* (2013.01); B60K 2006/4825 (2013.01); B60W 2510/083 (2013.01); B60W 2540/10 (2013.01); B60W 2710/0666 (2013.01); *B60W 2710/083* (2013.01); Y10S 903/93 (2013.01)

(58) Field of Classification Search
CPC .......... B60W 10/06; B60W 2710/083; B60W 2540/10; B60W 2710/0666; B60W 2510/083; B60K 6/442; B60K 2006/4825; Y10S 903/93
See application file for complete search history.

(56) References Cited

U.S. PATENT DOCUMENTS

| | | | |
|---|---|---|---|
| 6,301,529 B1* | 10/2001 | Itoyama | B60K 6/485 701/22 |
| 6,328,671 B1* | 12/2001 | Nakajima | B60K 6/485 477/46 |
| 6,342,027 B1* | 1/2002 | Suzuki | B60W 10/02 477/5 |
| 7,179,195 B2 | 2/2007 | Joe | |
| 7,472,769 B2 | 1/2009 | Yamanaka et al. | |
| 7,784,575 B2 | 8/2010 | Yamanaka et al. | |
| 9,233,686 B2* | 1/2016 | Park | B60W 20/40 |
| 2001/0037905 A1* | 11/2001 | Nogi | B60K 6/445 180/65.235 |
| 2003/0176955 A1* | 9/2003 | Minagawa | B60K 6/445 701/22 |
| 2004/0009842 A1* | 1/2004 | Inada | B60K 6/442 477/5 |
| 2005/0090370 A1* | 4/2005 | Berger | F16F 15/14 477/167 |
| 2007/0049444 A1* | 3/2007 | Gumpoltsberger | F16H 3/663 475/5 |
| 2007/0162200 A1* | 7/2007 | Zillmer | B60K 6/48 701/22 |
| 2007/0205030 A1* | 9/2007 | Shibata | B60K 6/365 180/65.28 |
| 2007/0278021 A1* | 12/2007 | Pott | B60W 20/10 180/65.285 |
| 2010/0038158 A1* | 2/2010 | Whitney | B60W 30/16 180/65.265 |
| 2010/0248893 A1* | 9/2010 | Shimanaka | B60K 6/48 477/5 |
| 2011/0257823 A1* | 10/2011 | Watanabe | B60K 6/445 701/22 |
| 2012/0006152 A1* | 1/2012 | Fuechtner | B60K 6/52 74/640 |
| 2013/0124027 A1* | 5/2013 | Tanishima | B60K 6/48 701/22 |
| 2013/0190953 A1* | 7/2013 | Niemann | B60K 6/48 701/22 |
| 2015/0224984 A1* | 8/2015 | Kees | B60W 10/06 701/22 |
| 2016/0090077 A1* | 3/2016 | Choi | B60W 10/06 701/22 |
| 2016/0368484 A1* | 12/2016 | Lee | B60W 10/06 |
| 2017/0036664 A1* | 2/2017 | Yang | B60W 10/02 |
| 2017/0051707 A1* | 2/2017 | Wright | F02D 41/10 |
| 2017/0066431 A1* | 3/2017 | Kim | B60W 10/08 |
| 2017/0282900 A1* | 10/2017 | Suzuki | B60W 10/06 |
| 2018/0126977 A1* | 5/2018 | Kim | G08G 1/096791 |
| 2018/0297576 A1* | 10/2018 | Lee | B60K 6/442 |
| 2018/0326974 A1* | 11/2018 | Kim | B60W 20/50 |
| 2019/0092313 A1* | 3/2019 | Lee | B60W 10/06 |
| 2020/0099323 A1* | 3/2020 | Luedtke | H02P 21/22 |

FOREIGN PATENT DOCUMENTS

| | | |
|---|---|---|
| KR | 10-0992733 B1 | 11/2010 |
| KR | 10-2014-0048586 A | 4/2014 |
| KR | 10-1558769 B1 | 10/2015 |
| KR | 10-1583973 B1 | 1/2016 |

OTHER PUBLICATIONS

Google Patents efficiency search (Year: 2019).*
IP search hybrid efficiency (Year: 2019).*
JP2017177973A Translation (Year: 2017).*
Hybrid Electric Vehicle Quick Start Capability Using Integrated Starter Generator (Year: 2008).*
Torque Split Strategy for Parallel Hybrid Electric Vehicles with an Integrated Starter Generator (Year: 2014).*

* cited by examiner

-Prior Art-

-Prior Art-

HYBRID VEHICLE AND METHOD OF CONTROLLING MODE TRANSITION THEREOF

This application claims the benefit of priority to Korean Patent Application No. 10-2017-0049178, filed on Apr. 17, 2017, which is hereby incorporated by reference as if fully set forth herein.

TECHNICAL FIELD

The present disclosure relates to a hybrid vehicle and a method of controlling a mode transition thereof, and more particularly, to a method of controlling a mode transition, which is capable of satisfying a driver's required torque in a driving-mode transition situation, and a hybrid vehicle in which the same is implemented.

BACKGROUND

In general, a hybrid electric vehicle (HEV) is a vehicle that uses two types of power sources together, and the two types of power sources are typically an engine and an electric motor. Such a hybrid vehicle has excellent fuel efficiency and power performance and is advantageous in that the amount of exhaust gas is reduced compared to a vehicle having only an internal combustion engine, and thus has been actively developed in recent years.

The hybrid vehicle may be operated in two driving modes depending on the types of power trains that are driven. One of them is an electric-vehicle (EV) mode in which the hybrid vehicle is driven using only the electric motor and the other one is a hybrid-electric-vehicle (HEV) mode in which the hybrid vehicle obtains power by operating both the electric motor and the engine. The hybrid vehicle transitions between the two modes depending on conditions during driving.

Among various types of hybrid vehicles, in the case of a parallel-type hybrid vehicle, an engine clutch is disposed between an engine and an electric motor and serves to connect or separate a rotating shaft of the engine to or from a rotating shaft of the electric motor. For example, the engine clutch is in an open state in the EV mode, whereas the engine clutch is in an engaged state in the HEV mode. From the viewpoint of the orientation of the engine clutch, the engine side may be regarded as an input end and the electric motor side may be regarded as an output end.

In addition, the parallel-type hybrid vehicle includes a hybrid starter generator (HSG), which is connected to the rotating shaft of the engine via a pulley or the like so as to continuously rotate along therewith and which starts the engine (i.e. positive-torque operation) or performs electricity generation using power of the engine (i.e. negative-torque operation) depending on vehicle driving conditions.

In the case of a transition from the EV mode to the HEV mode, first, after the engine is started, the engine clutch may be engaged when the number of revolutions per minute of the engine and the number of revolutions per minute of the electric motor become equal to each other. In order to prevent shocks upon engagement, the torque of the input end of the engine clutch may be close to zero. Therefore, when the engine generates a torque, the HSG may be operated in an electricity generation mode to offset the torque generated by the engine, whereby the torque of the input end of the engine clutch may be adjusted to zero. The reason why this control is required is that the efficiency of the engine may be rapidly lowered when the engine is controlled so as to output a low torque, and therefore, it is necessary generate a torque having a predetermined magnitude or more in order to ensure engine efficiency, but is also necessary offset the torque via electricity generation by the HSG (i.e. by a counter torque). Thus, under this situation, torque components of the HSG may be divided into a speed control component for synchronizing the speeds of the engine and the electric motor and a charge torque component for increasing engine efficiency.

However, in a general hybrid vehicle, since HSG charging is performed only in consideration of engine efficiency regardless of the vehicle driver's desire to accelerate, a driver's required torque may not be satisfied by HSG charging in some cases. This will be described in more detail with reference to FIGS. 1A and 1B.

FIG. 1 illustrates an example of the situation in which a driver's required torque is not satisfied by HSG charging in a general vehicle.

In the graphs of FIGS. 1A and 1B, the horizontal axes indicate the time, the vertical axis in the graph of FIG. 1A indicates the torque, and the vertical axis in the graph of FIG. 1B indicates the RPM. In addition, it is assumed that the graphs in FIGS. 1A and 1B have the same time axis.

Referring to FIGS. 1A and 1B, a driver's required torque is maintained above the maximum torque that may be generated by a motor. In this case, the vehicle decides to transition from the EV mode to the HEV mode. Thus, an HSG torque is controlled to a positive value in order to start an engine, and an engine clutch is engaged when a motor speed and an engine speed become equal to each other after the engine started. The torque generated by the engine while the engine clutch is engaged is used for HSG charging (i.e. negative torque). When the engine clutch engagement is completed, the engine torque is increased in order to satisfy the driver's required torque, the HSG charging stops, and the motor torque is reduced.

When the above-described mode transition control is performed, however, as illustrated in FIG. 1A, there occurs an area in which the required torque is not satisfied while the engine clutch is engaged.

SUMMARY

The present disclosure is directed to a hybrid vehicle and a method of controlling a mode transition thereof that substantially obviate one or more problems due to limitations and disadvantages of the related art.

An object of the present disclosure is to provide a method of controlling a mode transition more efficiently in a hybrid vehicle and a hybrid vehicle in which the same is implemented.

More particularly, an object of the present disclosure is to provide a method of controlling a mode transition that is capable of rapidly satisfying a driver's required torque in a mode-transition process and a vehicle in which the same is implemented.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an exemplary embodiment of the present disclosure, a method of performing a mode transition in a hybrid vehicle includes: determining, by a hybrid control unit (HCU), a transition from a first mode to a second mode; comparing, by the HCU, a driver's required torque with maximum torque of an electric motor; determining a compensation torque when the driver's required torque is greater than the maximum torque; and determining, by the HCU, a first torque to be output from an engine and a second torque to be output from a hybrid starter generator, which is connected to the engine, in consideration of the compensation torque and a system efficiency.

According to another exemplary embodiment of the present disclosure, a hybrid vehicle includes: a motor control unit (MCU) configured to control an electric motor and a hybrid starter generator; an engine control unit (ECU) configured to control an engine; and a hybrid control unit (HCU) configured to determine whether or not to perform a mode transition between a first mode in which the vehicle is driven using power of the electric motor and a second mode in which the vehicle is driven using power of both the electric motor and the engine, and to control the MCU and the ECU based on the determination The HCU compares a driver's required torque with a maximum torque of the electric motor when a transition from the first mode to the second mode is determined, determines a compensation torque when the driver's required torque is greater than the maximum torque, and determines a first torque to be output from the engine and a second torque to be output from the hybrid starter generator, which is connected to the engine, in consideration of the compensation torque and a system efficiency.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in more detail to a hybrid vehicle and an efficient control method for the same according to the present disclosure, examples of which are illustrated in the accompanying drawings. With respect to constituent elements used in the following description, suffixes "module" and "unit" are given or mingled with each other only in consideration of ease in the preparation of the specification, and do not have or serve as different meanings.

First, the structure of a hybrid vehicle, to which embodiments of the present disclosure may be applied, will be described with reference to FIG. 2.

Figure 2:
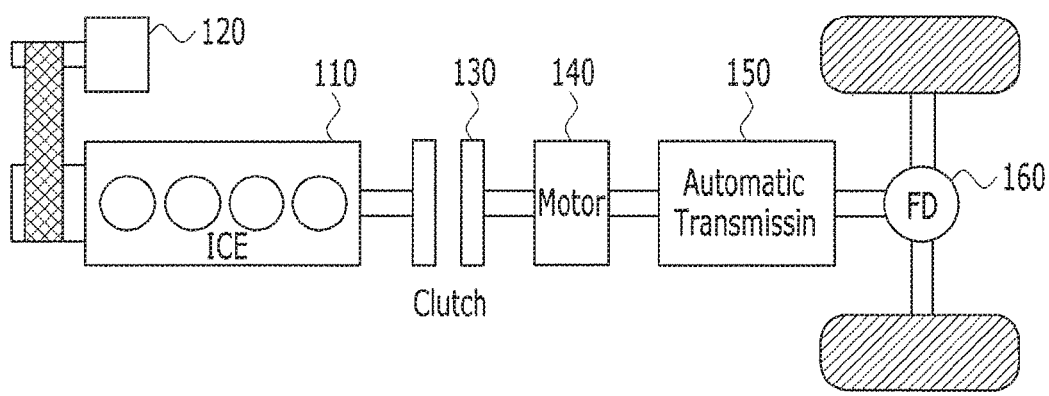
FIG. 2 illustrates an example of the power train structure of a hybrid vehicle to which embodiments of the present disclosure may be applied.

FIG. 2 illustrates an example of a power train structure of a hybrid vehicle to which embodiments of the present disclosure may be applied.

Referring to FIG. 2, there is illustrated a power train of a hybrid vehicle, which adopts a parallel-type hybrid system in which an electric motor (or a driving motor) 140 and an engine clutch 130 are mounted between an internal combustion engine (ICE) 110 and a transmission 150.

In this vehicle, generally, when a driver steps on an accelerator after starting, the motor 140 is first driven using power of a battery in an open state of the engine clutch 130 so that power of the motor 140 moves wheels by way of the transmission 150 and a final drive (FD) 160 (i.e. the EV mode). When a greater driving force is gradually required as the vehicle is gradually accelerated, a hybrid starter generator (HSG) 120 may be operated so as to start the engine 110.

Thereby, when the rotational speeds of the engine 110 and the motor 140 become equal to each other, the engine clutch 130 is finally engaged so that both the engine 110 and the motor 140 drive the vehicle (i.e. transition from the EV mode to the HEV mode). Then, when a predetermined engine-off condition, such as vehicle deceleration, is satisfied, the engine clutch 130 is opened and the engine 110 stops (i.e. transition from the HEV mode to the EV mode). Here, the vehicle charges the battery via the motor using the driving force of the wheels, and this is referred to as braking energy regeneration or regenerative braking. Thus, the HSG 120 serves as a start motor when starting the engine and then operates as a generator when gathering the rotational energy of the engine after the engine started or when the engine is turned off.

Figure 3:
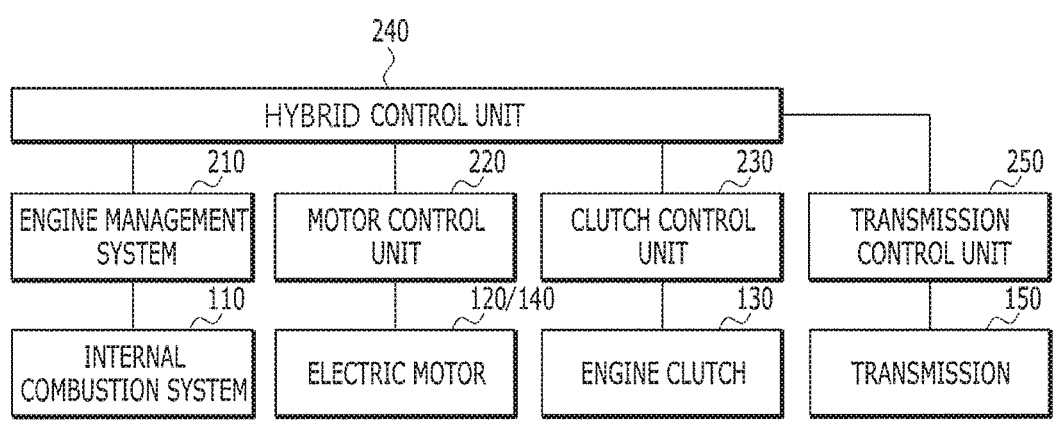
FIG. 3 is a block diagram illustrating an example of the control system of a hybrid vehicle to which embodiments of the present disclosure may be applied.

The mutual relation between control units in the vehicle in which the above-described power train is applied is illustrated in FIG. 3.

FIG. 3 is a block diagram illustrating an example of a control system of a hybrid vehicle to which embodiments of the present disclosure may be applied.

Referring to FIG. 3, in the hybrid vehicle to which embodiments of the present disclosure may be applied, the internal combustion engine 110 may be controlled by an engine control unit 210, the hybrid starter generator 120 and the motor 140 may be controlled in torque by a motor control unit (MCU) 220, and the engine clutch 130 may be controlled by a clutch control unit 230. Here, the engine control unit 210 is also referred to as an engine management system (EMS). In addition, the transmission 150 is controlled by a transmission control unit 250. In some embodiments, the hybrid starter generator 120 and the motor 140 may be controlled by separate different motor control units.

The respective control units may be connected to a control unit 240 (hereinafter referred to as a "hybrid controller" or "hybrid control unit (HCU)"), which is a superordinate control unit and performs overall control of the power train of the hybrid vehicle, and may provide the hybrid control unit 240 with information required for engine clutch control upon a driving-mode transition or upon gear shifting and/or information required for engine stop control, or may perform operations based on control signals, under the control of the hybrid control unit 240.

More specifically, the hybrid control unit 240 determines whether or not to perform a mode transition based on vehicle driving conditions. In one example, the hybrid control unit 240 determines a point in the time at which the engine clutch (EC) 130 is opened, and performs hydraulic control (in the case of a wet-type EC) or torque capacity control (in the case of a dry-type EC) when the engine clutch 130 is opened. In addition, the hybrid control unit 240 may determine the state of the EC 130 (e.g. a lock-up state, a slip state, or an open state) and may control a point in time at which the engine 110 stops fuel injection. In addition, the hybrid control unit 240 may control the torque of the hybrid starter generator 120 for engine stop control, thereby controlling the collection of engine rotational energy.

It will be apparent to those skilled in the art that the connection relationship between the control units and the functions/division of the respective control units described above are given by way of example and the control units are not limited to the description provided. For example, the hybrid control unit 240 may be realized such that the corresponding function thereof is provided by any one of the other control units excluding the hybrid control unit, or may be realized such that the corresponding function thereof is distributed and provided by two or more ones of the other control units.

Hereinafter, a method of controlling a mode transition according to the present embodiment will be described based on the above-described vehicle structure.

An embodiment of the present disclosure proposes that a hybrid control unit determines the operation of the HSG, i.e. charging or discharging, so as to perform discharging or zero torque control in the situation in which it is more important to satisfy a required torque so that the engine torque may be used as driving force. To this end, the hybrid control unit may refer to a transmissive torque depending on an engine clutch hydraulic pressure, and may allow the engine torque to be transmitted to the input end of a transmission when the engine is ready to output a torque, but may allow the HSG torque to be transmitted to the input end of the transmission before the engine is ready to output a torque. Thus, when the required torque is high, HSG charging is suppressed so that the engine torque may be used as driving force, and when the required torque is low, HSG charging is performed with the engine torque, which may increase both fuel efficiency and driving performance.

In conclusion, unlike transition from the EV mode to the HEV mode in a general hybrid vehicle in which the HSG torque includes a speed control component for synchronizing the speeds of the engine and the electric motor and a charge torque component for increasing engine efficiency, according to the present embodiment, the HSG torque may include, in addition to the speed control component, a driving torque component depending on an engine clutch transmissive torque. Hereinafter, the torque that needs to be added to the maximum torque of the electric motor in order to satisfy a driver's required torque is referred to as a "compensation torque". The compensation torque may consist of the engine torque and the HSG torque. Since a rotating shaft of the HSG is disposed parallel to a rotating shaft of the engine and is connected thereto via pulley, the HSG torque to be transmitted the rotating shaft of the engine is transitioned depending on the rotational ration of the pulley (hereinafter referred to as "HSG pulley ratio"). That is, the HSG pulley ratio may be calculated by dividing the HSG speed by the engine speed (HSG speed/engine speed). Thus, the torque, which is actually transmitted from the HSG to the rotating shaft of the engine, is a value acquired by multiplying the HSG torque by the pulley ratio.

A mode transition control process based on the above description will be described below with reference to FIG. 4.

Figure 4:
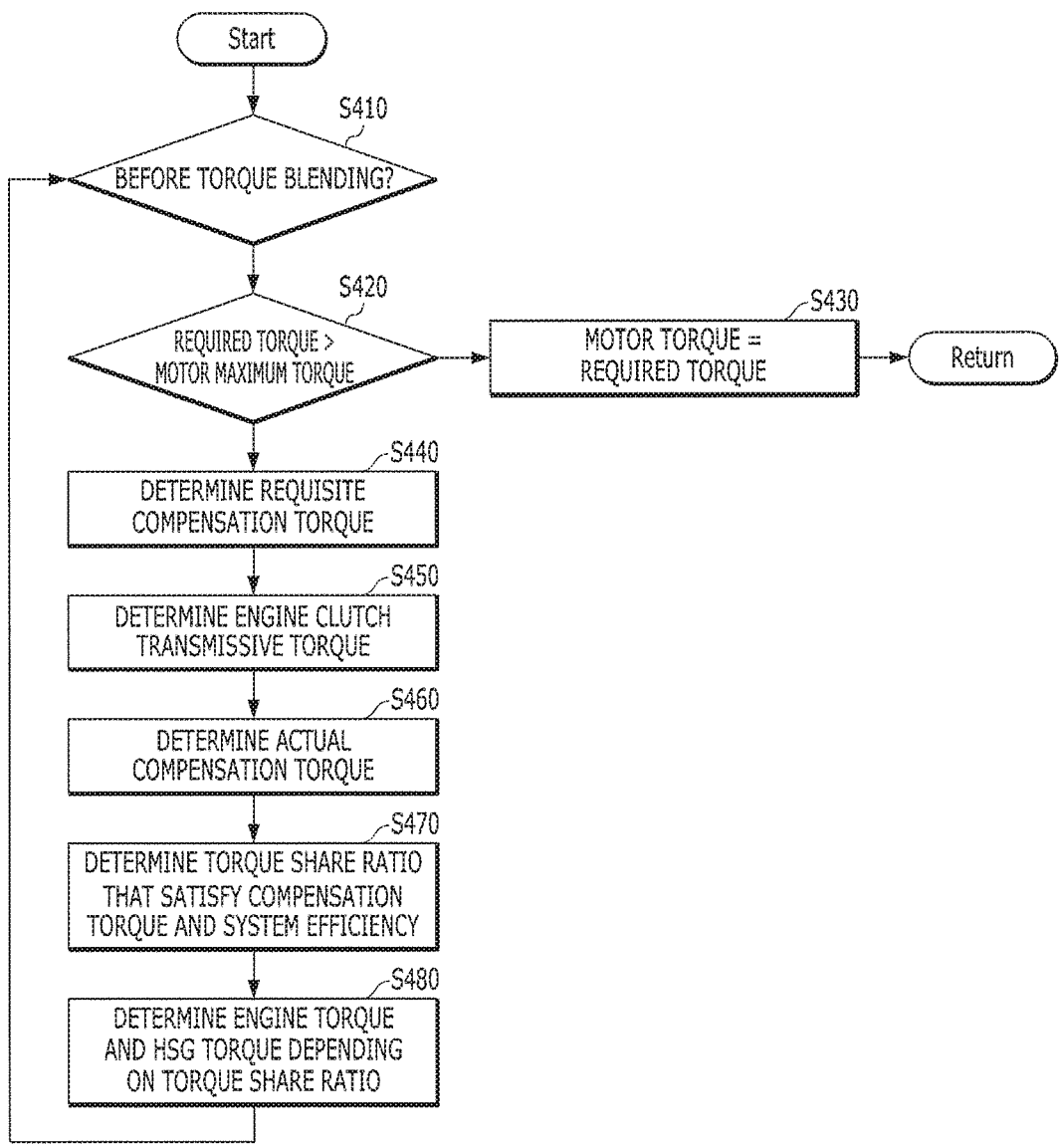
FIG. 4 illustrates an example of a mode-transition process according to an embodiment of the present disclosure.

FIG. 4 illustrates an example of a process of determining a compensation torque in a mode-transition process according to an embodiment of the present disclosure.

In FIG. 4, a situation in which the hybrid control unit decides to transition from the EV mode to the HEV mode is assumed. In addition, in FIG. 4, an output value such as, for example, a compensation torque, is assumed on the basis of a transmission input end.

Referring to FIG. 4, first, the hybrid control unit determines whether or not torque blending has already been performed after engine clutch engagement (S410). Here, "torque blending" may mean the situation in which control to adjust the outputs of the engine and the HSG in consideration of each other is performed in order to satisfy a target output.

When the determined result is that torque blending has not yet been performed, the hybrid control unit determines whether or not a required torque is greater than the maximum torque that can be output from the motor (S420). When the determined result is that the maximum torque of the motor is equal to or greater than the required torque, the hybrid control unit controls the motor to output the required torque (S430).

Conversely, when the required torque is greater than the maximum torque of the motor, a requisite compensation torque is calculated as the difference between the required torque and the maximum torque of the motor (S440).

The hybrid control unit may determine the torque to be transmitted to the output end of the engine clutch using the hydraulic pressure applied to the engine clutch and a kiss-point pressure (i.e. the hydraulic pressure caused by the contact of a clutch plate on the input end of the engine clutch and a clutch plate on the output end of the engine clutch) (S450). Once the transmissive torque has been acquired, the hybrid control unit may take the lesser value of the engine clutch transmissive torque and the requisite compensation torque as the compensation torque that is actually output to the transmission input end (S460).

At this time, the compensation torque is the sum of the engine torque and a value acquired by multiplying the HSG torque by the pulley ratio, as represented in the following Equation 1.

Compensation Torque=Engine Torque($A$)+HSG Torque($B$)*HSG Pulley Ratio    Equation 1

In the above Equation 1, the compensation torque and the HSG pulley ratio are previously given values. In addition, assuming that the torque of the engine is the engine torque $A$ and that the torque of the HSG is the HSG torque $B$, there may be multiple pairs of engine torque $A$ and HSG torque $B$ that satisfy the condition of Equation 1. For example, when the engine torque $A$ is a relatively large value, the HSG torque $B$ needs to be a relatively small value in order to satisfy Equation 1, and when the engine torque $A$ is a relatively small value, the HSG torque $B$ needs to be relatively large value in order to satisfy Equation 1. In conclusion, a pair of torque values is constituted since one value of the engine torque $A$ corresponds to one value of the HSG torque $B$, and the magnitude ratios, i.e. the torque share ratios of the engine torque $A$ and the HSG torque $B$, become different for each pair of torque values.

In order to distinguish the multiple pairs of torque values from each other, a number "$i$" may be given to each pair of torque values. That is, "$i$" may be given to "A" and "B" of the engine torque A and the HSG torque B so that the multiple pairs of the engine torque value Ai and the HSG torque value Bi that satisfy the Equation 1 may be distinguished from each other, and a difference in "i" may mean that the share ratios of the engine torque and the HSG torque with respect to the compensation torque are different from each her. In other words, "Ai" and "Bi" may mean the $i^{th}$ pair of the engine torque share ratio A and the HSG torque share ratio B.

The hybrid control unit determines how much torques the engine and the HSG need to output in order to satisfy the compensation torque in terms of efficiency (S470 and S480).

Specifically, taking the sum of engine efficiency and HSG efficiency as overall system efficiency (Eff_sys$_i$, i=1, 2, 3, . . . , n), the system efficiency may be represented by the following Equation 2.

$$\text{Eff\_sys}_i = \text{Eff}_{sys}\text{Eng}(\text{Engine Speed, Engine Torque } A_i) * \left(\frac{A_i}{A_i + B_i * \text{HSG Pulley Ratio}}\right) + $$
$$\text{Eff}_{sys}\text{HSG}(\text{HSG Speed, HSG Torque } B_i) * \left(\frac{B_{ii} * \text{HSG Pulley Ratio}}{A_i + B_i * \text{HSG Pulley Ratio}}\right)$$

Equation 2

That is, the system efficiency may be represented by the sum of a value, which is obtained by multiplying the engine efficiency, based on the engine speed and the engine torque, $\text{Eff}_{sys}\text{Eng}(\text{Engine Speed, Engine Torque } A_i)$ by the torque share ratio of the engine $$\left(\frac{A_i}{A_i + B_i * \text{HSG Pulley Ratio}}\right),$$

and a value, which is obtained by multiplying the HSG efficiency, based on the HSG speed and the HSG torque, $\text{Eff}_{sys}\text{HSG}(\text{HSG Speed, HSG Torque } B_i)$ by the torque share ratio of the HSG $$\left(\frac{B_{ii} * \text{HSG Pulley Ratio}}{A_i + B_i * \text{HSG Pulley Ratio}}\right).$$

The hybrid control unit may determine the torque share ratios, i.e. ($A_i$, $B_i$), at which the system efficiency becomes the maximum Max(Eff_sys$_i$), based on the above Equation 2 (S470).

Thereby, the torque to be output from the engine and the torque to be output from the HSG may be determined as in the following Equation 3 (S480).

HSG Torque $B$=Max_Eff_sys(HSG Torque$_i$)

Engine Torque $A$=Max_Eff_sys(Engine Torque$_i$)  Equation 3

That is, the HSG torque is the value to which the torque share ratio Bi that satisfies the maximum system efficiency is applied, and the engine torque is the value to which the torque share ratio Ai that satisfies the maximum system efficiency is applied.

In summary, through the process described above, the engine torque value and the HSG torque value, which satisfy the condition in which the compensation torque is the sum of a value, acquired by multi the HSG torque by the HSG pulley ratio, and the engine torque and which provide the maximum system efficiency, may be determined.

In order to allow the engine and the HSG to output the respective determined torques, the hybrid control unit may transmit torque commands to the engine control unit and the motor control unit respectively. Of course, the electric motor is controlled so as to output the maximum possible torque.

The effects acquired by the above-described control process will be described below with reference to FIGS. 5A and 5B.

Figure 5A:
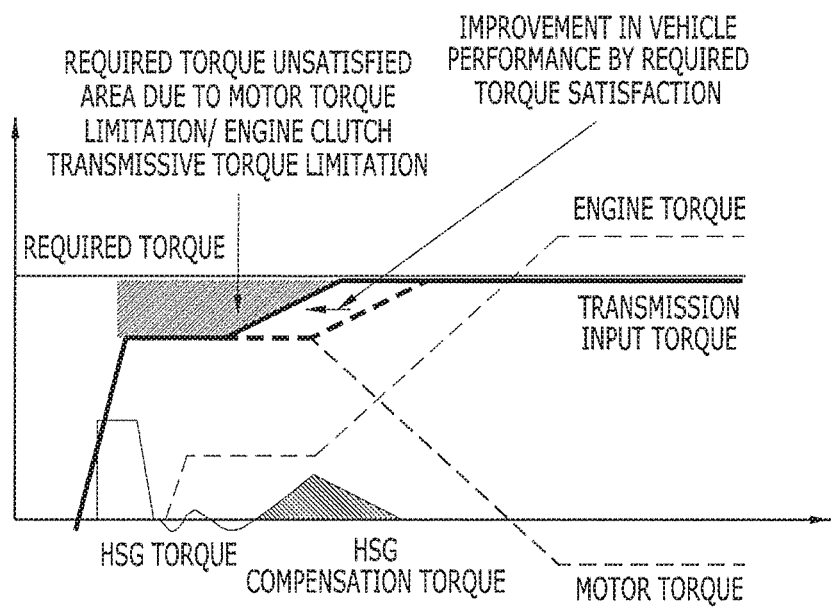
FIGS. 5A and 5B are views for explaining the effect of a mode-transition process performed in a hybrid vehicle according to an embodiment of the present disclosure.
Figure 5B:
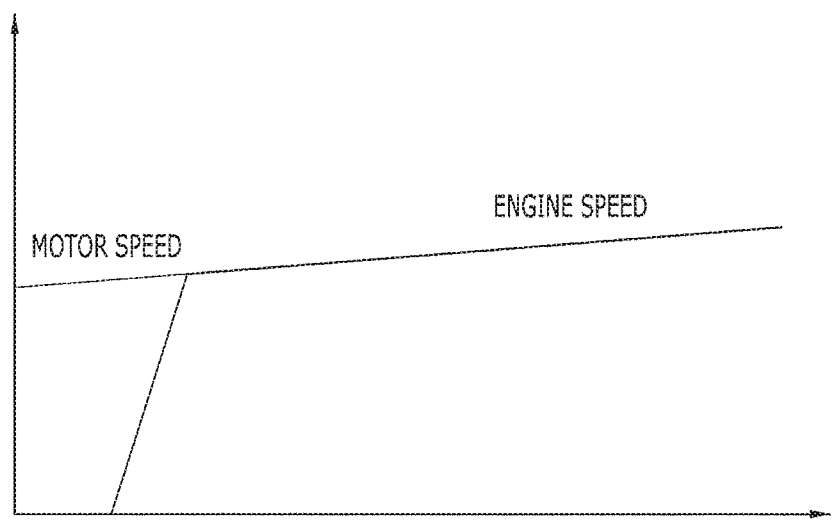

FIGS. 5A and 5B are views for explaining the effect of a mode-transition process performed in the hybrid vehicle according to an embodiment of the present disclosure.

In the graphs of FIGS. 5A and 5B, the horizontal axes indicate the time, the vertical axis in the graph of FIG. 5A indicates the torque, and the vertical axis in the graph of FIG. 5B indicates the RPM.

Figure 1A:
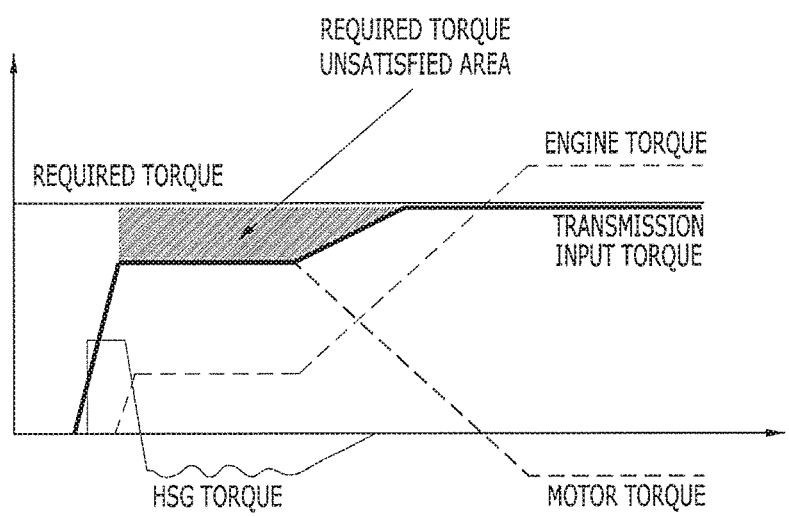
FIGS. 1A and 1B illustrate an example of the situation in which a driver's required torque is not satisfied by HSG charging in a general vehicle.
Figure 1B:
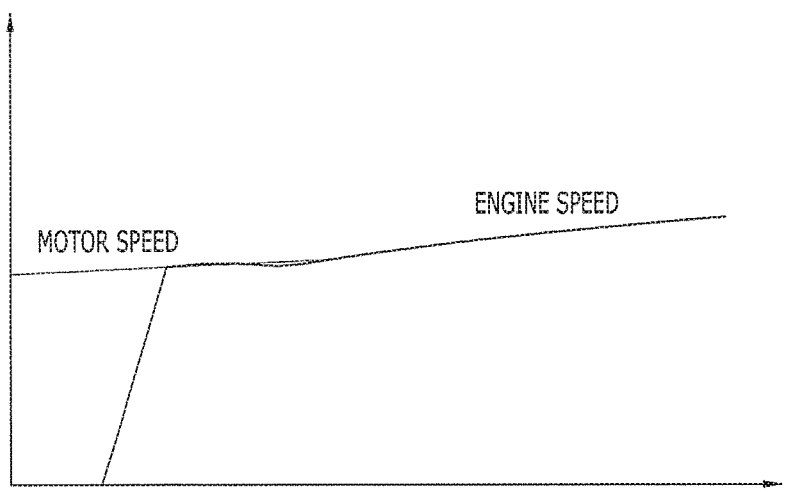

Referring to FIGS. 5A and 5B, a driver's required torque is maintained above the maximum torque that can be output by the motor. In this case, the vehicle decides to transition from the EV mode to the HEV mode. Thus, the HSG torque is controlled to a positive value in order to start the engine, and the engine clutch is engaged when a motor speed and an engine speed become equal to each other after the engine started. Although an area in which the required torque cannot be satisfied may occur before sufficient engine clutch transmissive torque is formed even if the motor generates the maximum torque while the engine clutch is engaged, since the HSG outputs a compensation torque via discharging, instead of performing charging with the torque of the engine, a required torque unsatisfied area is reduced compared to the case of FIG. 1. Thus, through the control according to the present embodiment, it is possible to more rapidly follow the driver's required torque in a mode-transition process, which may increase driving performance.

The invention described above may be implemented as computer readable code in a medium in which a program is recorded. Computer readable recording media include all kinds of recording devices in which data readable by computer systems is stored. The computer readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a hybrid vehicle associated with at least one embodiment of the present disclosure having the above-described configuration is capable of performing a mode transition more efficiently.

Particularly, since an engine torque may be used to satisfy a driver's required torque, rather than being used for electricity generation, depending on the conditions in a mode-transition process, driving performance may be improved.

Particularly, when knocking occurs in an engine, a reduction in torque due thereto may be compensated for by an electric motor, which may prevent deterioration in output and increase fuel efficiency.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A method of performing a mode transition in a hybrid vehicle, the method comprising steps of:

determining, by a hybrid control unit (HCU), a transition from a first mode to a second mode;

comparing, by the HCU, a required torque with a maximum torque of an electric motor;

determining, by the HCU, a compensation torque when the required torque is greater than the maximum torque; and determining, by the HCU, a first torque to be output from an engine and a second torque to be output from a hybrid starter generator, which is connected to the engine, in consideration of the compensation torque and a system efficiency, wherein the compensation torque includes the first torque to be output from the engine and the second torque to be output from the hybrid starter generator, wherein a first duration during which the compensation torque is output from the hybrid starter generator, a second duration during which the electric motor is outputting the maximum torque, and a third duration during which a transmissive torque of an engine clutch is formed due to an engagement of the engine clutch are at least partly overlapped during the transition, and wherein the hybrid starter generator, the electric motor, and the engine drive a same driving axle of the hybrid vehicle.

2. The method according to claim 1, wherein the step of determining the compensation torque comprises:
acquiring a requisite compensation torque;
acquiring an engine clutch transmissive torque; and
determining the compensation torque using the requisite compensation torque and engine clutch transmissive torque.

3. The method according to claim 2, wherein the step of determining the compensation torque using the requisite compensation torque and the engine clutch transmissive torque comprises: determining, as the compensation torque, a lesser value of the requisite compensation torque and the engine clutch transmissive torque.

4. The method according to claim 1, wherein the step of determining the first torque and the second torque is performed to satisfy a first condition in which a sum of the first torque and a third torque, which is acquired by multiplying the second torque by a pulley ratio of the hybrid starter generator, corresponds to the compensation torque.

5. The method according to claim 4, wherein the step of determining the first torque and the second torque comprises:
determining torque share ratios of the engine and the hybrid starter generator to satisfy a second condition in which the system efficiency is increased while satisfying the first condition.

6. The method according to claim 5, wherein the step of determining the first torque and the second torque further comprises: determining the first torque and the second torque using the determined torque share ratios.

7. The method according to claim 5, wherein the system efficiency is determined by a sum of a first value, which is acquired by multiplying an efficiency of the engine by the torque share ratio of the engine, and a second value, which is acquired by multiplying an efficiency of the hybrid starter generator by the torque share ratio of the hybrid starter generator.

8. The method according to claim 6, further comprising:
transmitting, by the HCU, a. first torque command, which corresponds to the determined first torque to an engine control unit (ECU), which controls the engine; and transmitting, by the HCU, a second torque command, which corresponds to the determined second torque to a motor control unit (MCU), which controls the hybrid starter generator.

9. The method according to claim 1, wherein the first mode is an electric vehicle (EV) mode, and the second mode is a hybrid electric vehicle (HEV) mode.

10. The method according to claim 1, wherein the step of comparing is performed when torque blending is not performed after engine clutch engagement.

11. A hybrid vehicle comprising:
a motor control unit (MCU) configured to control an electric motor and a hybrid starter generator;
an engine control unit (ECU) configured to control an engine;
a hybrid control unit (HCU) configured to determine whether or not to perform a mode transition between a first mode in which the vehicle is driven using power of the electric motor and a second mode in which the vehicle is driven using power of both the electric motor and the engine, and to control the MCU and the ECU based on the determination, and
wherein the HCU compares a required torque with a maximum torque of the electric motor when a transition from the first mode to the second mode is determined, determines a compensation torque when the required torque is greater than the maximum torque, and determines a first torque to be output from the engine and a second torque to be output from the hybrid starter generator, which is connected to the engine, in consideration of the compensation torque and a system efficiency,
wherein the compensation torque includes the first torque to be output from the engine and the second torque to be output from the hybrid starter generator,
wherein a first duration during which the compensation torque is output from the hybrid starter generator, a second duration during which the electric motor is outputting the maximum torque, and a third duration during which a transmissive torque of an engine clutch is formed due to an engagement of the engine clutch are at least partly overlapped during the transition, and
wherein the hybrid starter generator, the electric motor, and the engine drive a same driving axle of the hybrid vehicle.

12. The hybrid vehicle according to claim 11, wherein the HCU determines the compensation torque using a requisite compensation torque and an engine clutch transmissive torque.

13. The hybrid vehicle according to claim 12, wherein the HCU determines, as the compensate torque, a lesser value of the requisite compensation torque and the engine clutch transmissive torque.

14. The hybrid vehicle according to claim 11, wherein the HCU determines the first torque and the second torque to satisfy a first condition in which a sum of the first torque and a third torque, which is acquired by multiplying the second torque by a pulley ratio of the hybrid starter generator, corresponds to the compensation torque.

15. The hybrid vehicle according to claim 14, wherein the HCU determines torque share ratios of the engine and the hybrid starter generator to satisfy a second condition in which the system efficiency is increased while satisfying the first condition.

16. The hybrid vehicle according to claim 15, wherein the HCU determines the first torque and the second torque using the determined torque share ratios.

17. The hybrid vehicle according to claim 15, wherein the system efficiency is determined by a sum of a first value, which is acquired by multiplying an efficiency of the engine by the torque share ratio of the engine, and a second value, which is acquired by multiplying an efficiency of the hybrid starter generator by the torque share ratio of the hybrid starter generator.

18. The hybrid vehicle according to claim 16, wherein the HCU transmits a first torque command, which corresponds to the determined first torque, to the ECU, and transmits a second torque command, which corresponds to the determined second torque, to the MCU.

19. The hybrid vehicle according to claim 11, wherein the first mode is an electric vehicle (EV) mode, and the second mode is a hybrid electric vehicle (HEV) mode.

20. The hybrid vehicle according to claim 11, wherein the HCU performs the comparison between the required torque and the maximum torque when torque blending is not yet performed after engine clutch engagement.

* * * * *